SECTORIZED MEMORY WITH PARALLEL SECTOR OPERATION

Filed June 29, 1962

5 Sheets-Sheet 1

INVENTORS
FRANK R. PALM
ALBERT W. VINAL
BY Ralph R Barnard
ATTORNEY

SECTORIZED MEMORY WITH PARALLEL SECTOR OPERATION 3,278,912
Patented Oct. 11, 1966

3,278,912

SECTORIZED MEMORY WITH PARALLEL SECTOR OPERATION

Albert W. Vinal, Owego, and Frank R. Palm, Newark Valley, N.Y., assignors to International Business Machines Corporation, New York, N.Y., a corporation of New York Filed June 29, 1962, Ser. No. 206,412
6 Claims. (Cl. 340—174)

The present invention relates generally to electronic digital computer systems and more particularly to a computer system including a memory organization for providing rapid access to data and instruction words.

As those skilled in the art know, the speed with which computer systems can operate to calculate and process electronic digital information is limited by the time required to communicaate with the memory or storage system. While the time required for arithmetic computations of either the simple or complicated variety is definitive, it is comparatively short with respect to the time required to read information from a memory or write information into a memory.

For example, when the instruction and data words of a computer system are stored in a drum, disc or tape memory, time is required before a particular location in memory is available to cooperate with read and write transducers. This category of memories has been classified as one in which time is one coordinate of the memory access.

Another group of memory system is known as the random access type meaning generally that at a particular time any particular location in the memory may be addressed for a reading or writing operation. For example, toroidal core arrays are used as memories where each toroidal core stores a binary digital quantity represented by a plus or minus remanent magnetic condition. One feature of this type of memory is that whenever one or more magnetic toroidal cores are subjected to a reading operation to determine the magnetic condition stored therein that magnetic condition is destroyed and each reading operation must be followed by a writing operation to preserve the stored information if that is desired. Accordingly, the memory access time of the destructive type memory described must include both the reading and writing cycle. The information read from memory may be processed in the arithmetic portion of the computer immediately. However, new information cannot be obtained from memory until the previous read-write cycle has been completed. One way the prior art has overcome this problem is to use an additional or plural memory system, complete with addressing, sensing and inhibiting instrumentation so that information is made available to the arithmetic unit as fast as it can be processed. This technique is variously known as the parallel operation of memories or overlap. Often the two of more complete memories are used in cooperation with the fast temporary memory so that information is available to the arithmetic or processing unit as fast as it can be handled. When an additional temporary buffer memory is used, this technique has been called "look ahead." These techniques for avoiding the time limitations of communicating with the memory sub-systems of a computer system have had the short-coming of greatly increasing the computer component count, physical size etc.

Not all magnetic storage elements are of the destructive readout toroidal core type. For example, one known memory element is the transfluxor type multiaperture device in which a read operation merely reverses the remanent flux around a read aperture. One example of a memory system utilizing a transfluxor type memory element is shown in copending patent application Serial No. 91,961, entitled "Improved Magnetic Memory Instrumentation," filed February 27, 1961, and now U.S. Patent No. 3,212,068, inventor A. W. Vinal and assigned to the same assignee as the present application. Therein the memory element may be read or interrogated without the requirement of following the reading operation with a writing operation. However, for a number of reasons including flux referencing, each reading operation includes a current energization waveform having both positive and negative half cycles. As a result, the stored digital information in any memory element is available twice—once during the first half cycle of the address current energization, and a second time during the negative cycle of the addressing current energization. Accordingly, a straightforward single memory operation would require essentially the same memory time as the aforementioned nondestructive type memory system in which every read operation had to be followed by a write operation. However, since the reading operation can be performed during either the positive polarity current addressing half cycle or the negative polarity current addressing half cycle the nondestructive memory system has a heretofore unused capability of being used in a plural parallel memory approach to speed up computer system operation. The plural memories (or memory sectors) in fact may share addressing, sensing and inhibiting instrumentation. This is especially true inasmuch as the writing operation may also use both in positive polarity current addressing half cycle and a negative polarity current addressing half cycle. The above referred to copending application illustrates this use of a positive and negative half cycle in both the reading and writing operation in a nondestructive memory system.

It is, therefore, a primary object of the present invention to provide a new and improved system where plural memories may be used to provide stored information (data and instruction words) at a fast rate to the computer system without fully duplicating addressing, sensing and inhibiting instrumentation for each memory unit.

It is another object of the present invention to provide a new and improved system where two memories may be used to provide stored information (data and instruction words) at a fast rate to the computer system without fully duplicating addressing, sensing and inhibiting instrumentation for each memory unit.

It is a further object of the present invention to provide a new and improved system where two memory units may be separately addressed, one for a reading operation and the other for a writing operation on the (two opposite polarity) addressing current half cycles to provide for the reading and storage of information at a fast rate to the computer system without fully duplicating addressing, sensing and inhibiting instrumentation for each memory unit.

It is still another object of the present invention to provide a new and improved system where two memory units may be separately addressed, one for a reading operation and the other for a writing operation on the (two opposite polarity) addressing current half cycles to provide for the reading and storage of information at a fast rate to the computer system without fully duplicating addressing, sensing and inhibiting instrumentation for each memory unit.

It is an additional object of the present invention to provide a new and improved system where two memory units may be separately addressed for a reading and/or writing operation, each on separate half cycles of the positive and negative addressing current cycle wherein the sequence of selecting the two memory units may be altered at the start of any addressing current cycle.

The above objects may be accomplished by constructing a memory consisting of nondestructive memory elements into two sectors so that distinct units of digital information may be stored in the two sectors at related address locations. Energizing means are utilized to cooperate with the nondestructive memory elements so that the full address energization of the elements forming a unit of information in one sector is simultaneous with the energization of a unit of information in the other sector. (The address location of the unit of information in one sector may be the same or merely related to the address location of the unit of information being addressed in the other sector. The degree of variation will be different as determined by the particular embodiment of the teachings of the present invention.) When the energization means provides an electrical quantity having a half cycle waveform of one polarity, the elements forming a unit of information in the first sector may be sensed for reading from the memory. Furthermore, during the second half cycle, when the energization means is providing an electrical quantity of the other polarity, a second unit of information may be read or written into the elements forming a unit of information in the second sector.

The foregoing and other objects, features and advantages of the invention will be apparent from the following more particular description of preferred embodiments of the invention, as illustrated in the accompanying drawings.

In the drawings:

FIGURE 1 shows a nondestructive type memory element which may be utilized in practicing the teachings of the present invention;

FIGURE 2 comprises current waveforms and flux patterns helpful in understanding the operation of the memory element of FIGURE 1;

Figure 4:
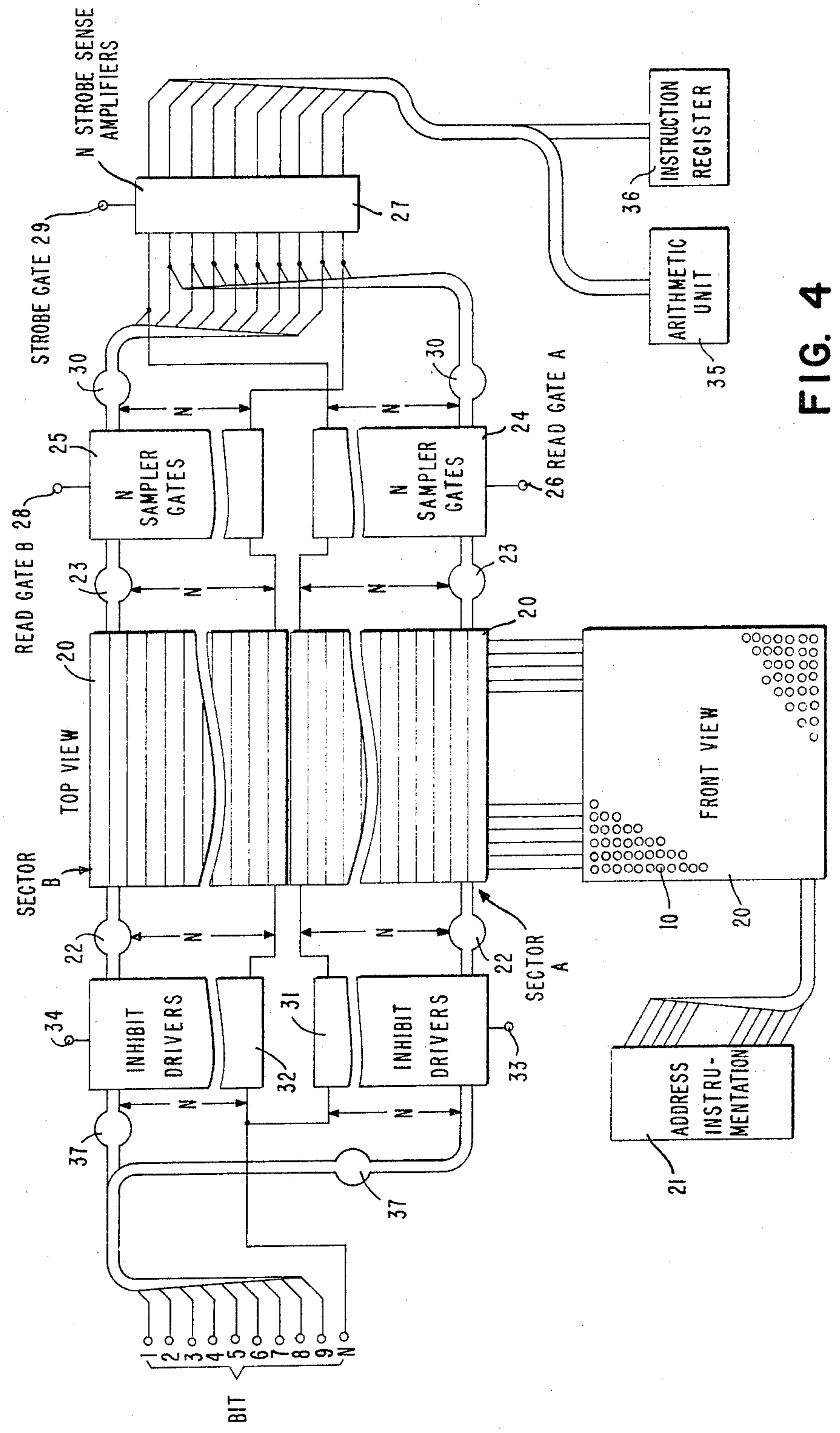
FIGURE 4 is a block diagram of the memory system according to the teachings of the present invention embodying a simplified addressing instrumentation.
Figure 5A:
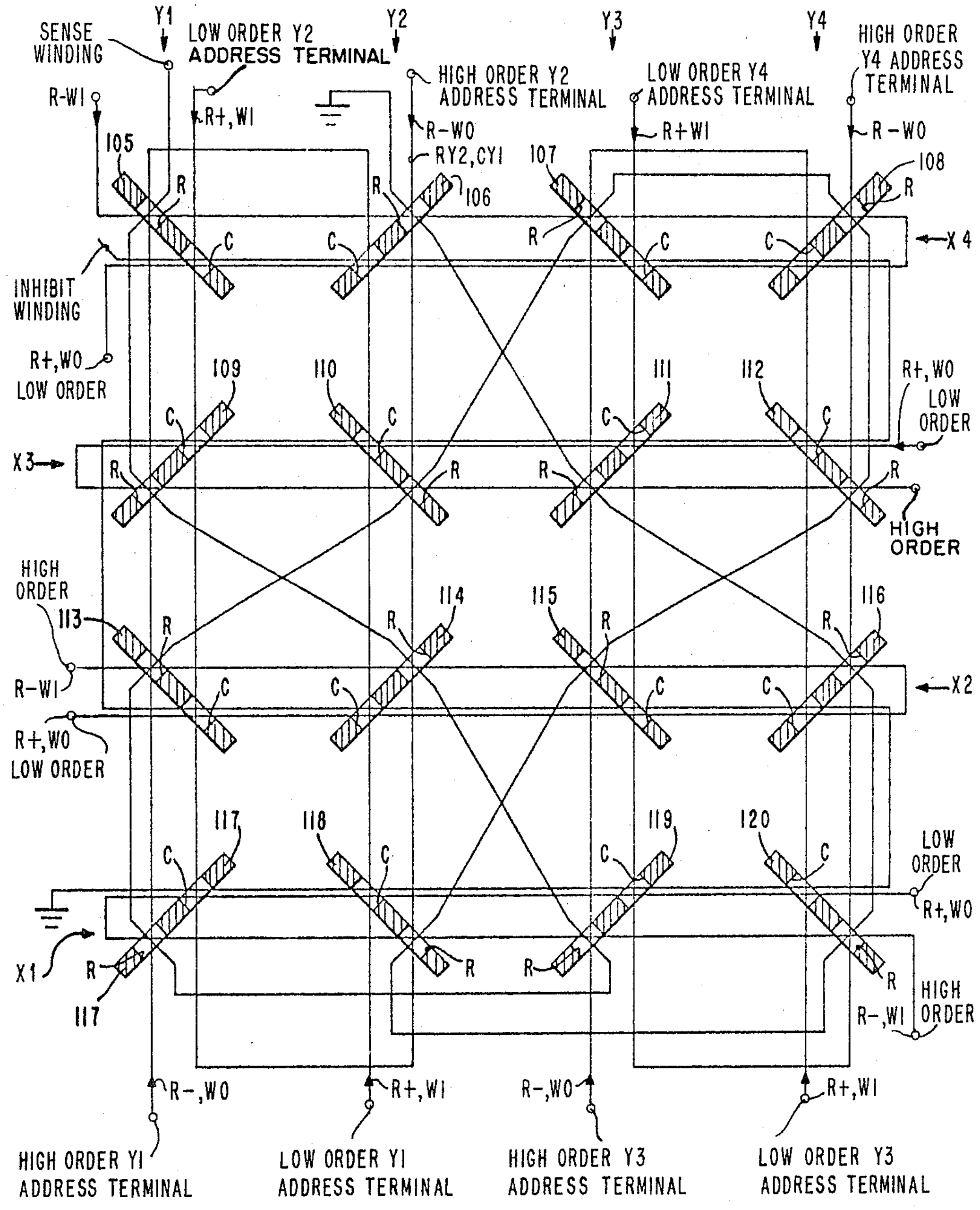
Figure 5B:
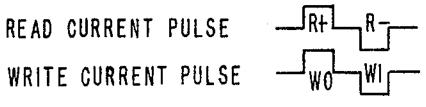
Figure 8:
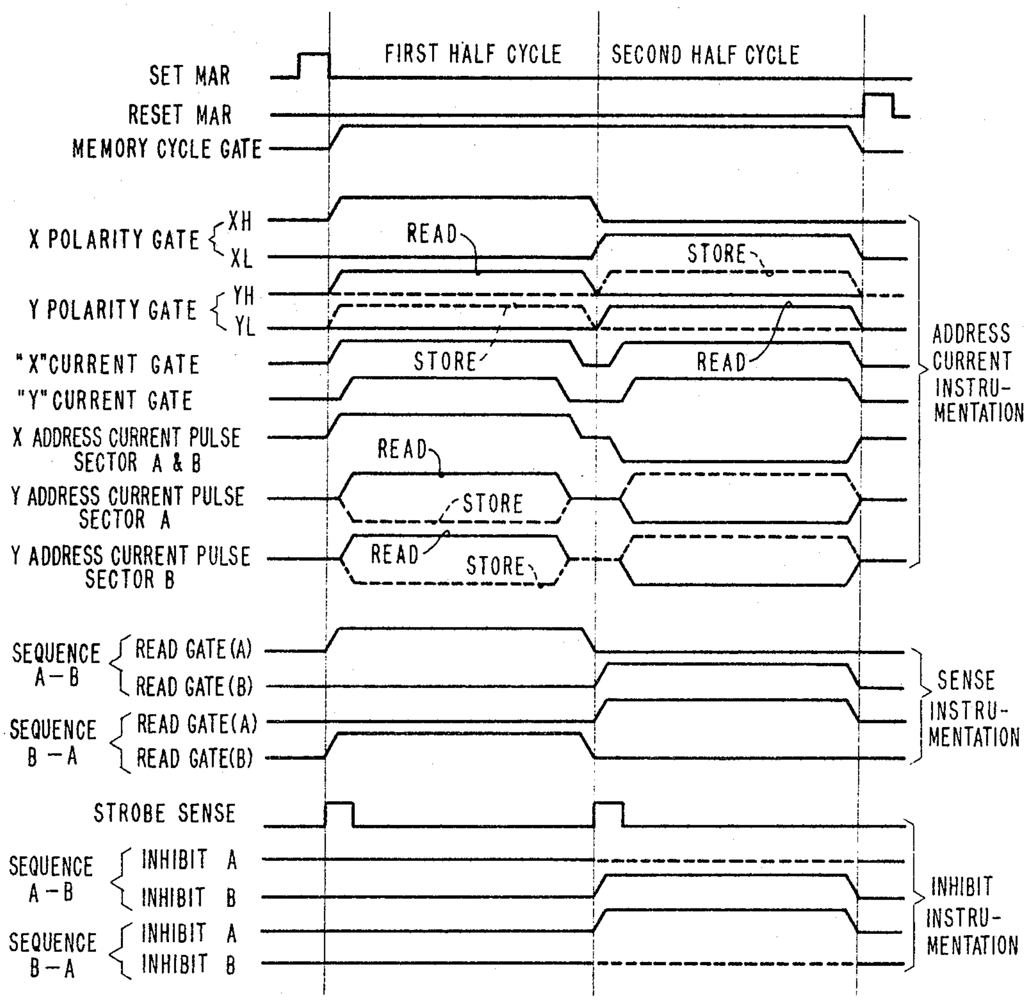
Figure 6:
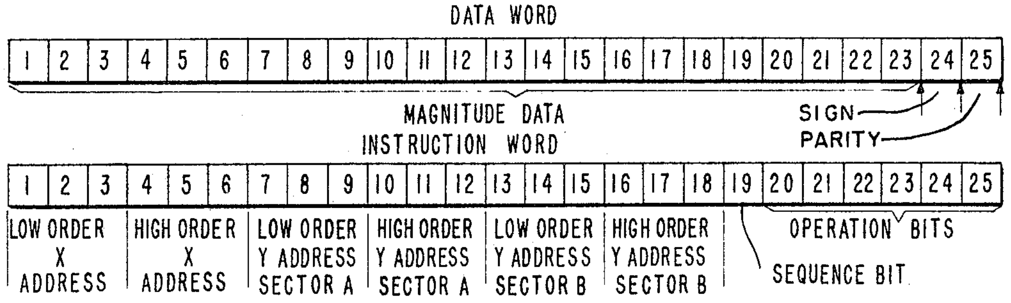
Figure 7:
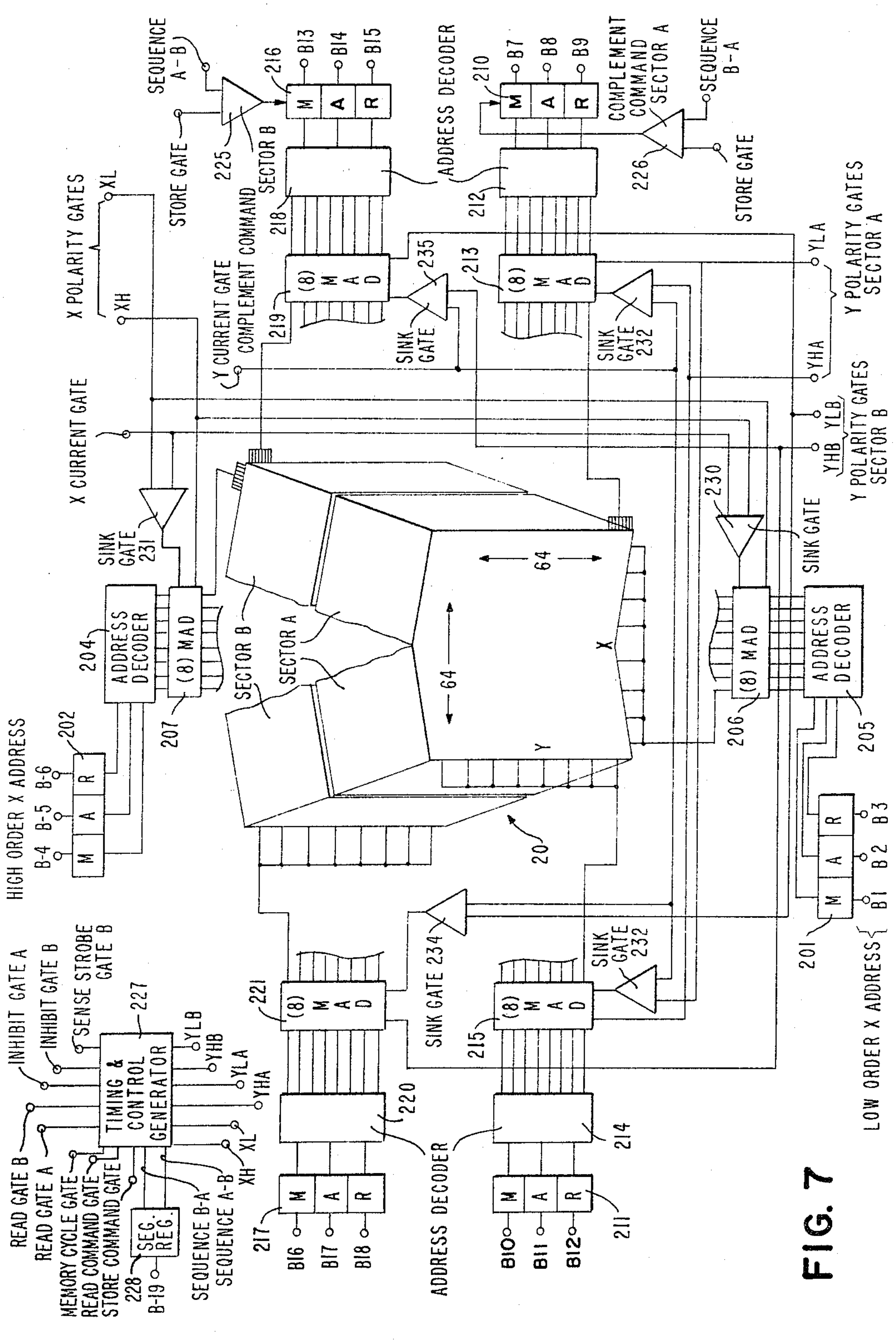

FIGURE 5A is an address conductor wiring arrangement according to the teachings of copending application, Serial No. 91,961, entitled "Improved Magnetic Memory Instrumentation," filed February 27, 1961, by A. W. Vinal, and assigned to the same assignee as the present application. This figure will be helpful in understanding the teachings of the present invention;

FIGURE 5B shows pulse waveforms helpful in understanding the wiring arrangement of FIGURE 5A;

FIGURE 6 is a block diagram of the instruction word format and data word format which may be used in the system of FIGURE 7 in accordance with the teachings of the present invention;

FIGURE 7 is an address instrumentation embodiment usable with the inhibit and sense instrumentation of FIGURE 4 in accordance with the teachings of the present invention; and FIGURE 8 has electrical waveforms helpful in understanding the operation of the teachings of the present invention as embodied in both FIGURES 4 and 7.

As set forth hereinabove, the present invention contemplates the use of nondestructive memory system environment wherein the read and write operations may both involve the use of alternate positive and negative addressing current pulses forming a full cycle. One memory element which may be used is that described in copending application, Serial No. 91,961, identified hereinabove. The device will be briefly described herein with reference to FIGS. 1, 2 and 3.

Figure 1:
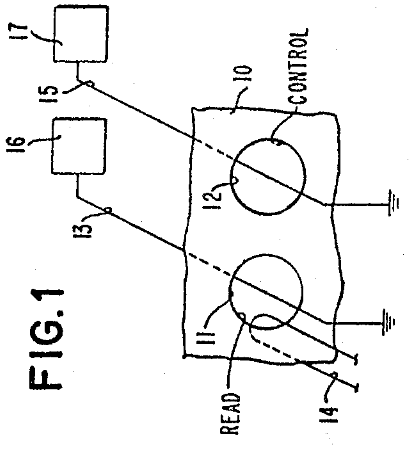

Referring to FIG. 1, two apertures are shown through a magnetic material consisting of core 10. Aperture 11 is designated as the read aperture while aperture 12 is designated as the control aperture. A read winding 13 is passed through read aperture 11 and a control winding 15 is passed through control aperture 12. For the purpose of passing alternate bipolar current pulses through read winding 13, a bipolar current driver 16 is shown connected thereto. Similarly, a bipolar current driver 17 is shown connected to control winding 15 for passing alternate bipolar current pulses therethrough.

Figure 2:
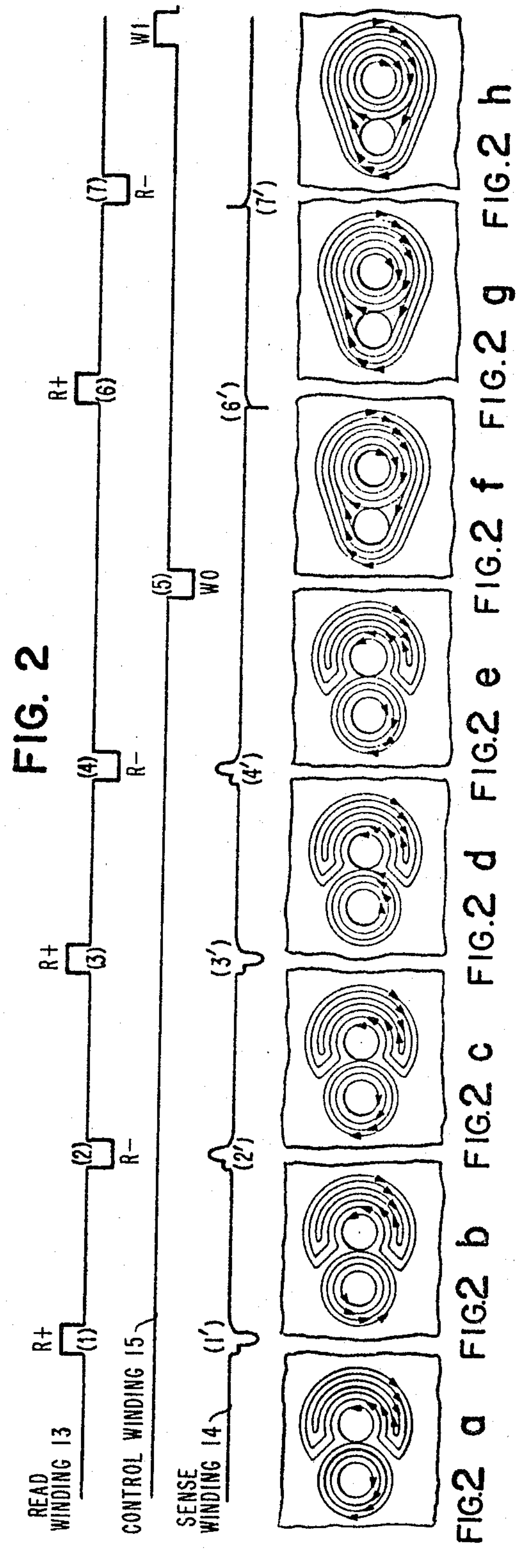
Figure 3:
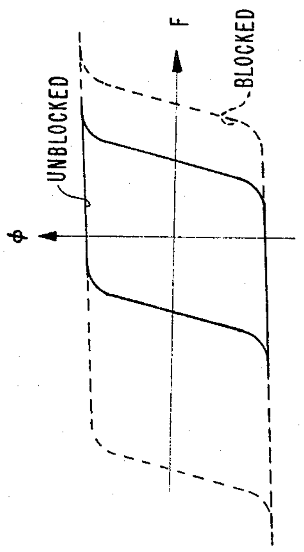
FIGURE 3 is a response-excitation characteristic for the read aperture of the memory element of FIGURE 1 during its two memory conditions.

The waveforms and flux patterns of FIG. 2 are for the purpose of illustrating the operation of the memory element of FIG. 1. FIG. 3 shows a response-excitation characteristic between read and sense windings 13 and 14, respecitvely, for each of the two stable coercivity conditions of the memory element of FIG. 1. When the magnetic device of FIG. 1 is in its unblocked condition represented by flux pattern 2(*a*) through 2(*e*) of FIG. 2, the alternate bipolar current pulses applied to read winding 13 successively reverse the flux around the read aperture 11 following the hysteresis loop shown by the solid line of FIG. 3 and induce voltages of particular polarities in sense winding 14. However, when the magnetic device of FIG. 1 is placed in its blocked condition, represented by the pattern shown by flux patterns 2(*f*) through 2(*h*), the alternate bipolar current pulses applied to read winding 13 are insufficient to cause the flux around aperture 11 to reverse and follow flux excitation characteristic shown in FIG. 3 require a much larger excitation F for flux reversal as shown by the dashed line.

More specifically, referring again to FIG. 2, the remanent flux pattern 2(*a*) shows an exemplary unblocked condition for the magnetic element of FIG. 1. Assuming that the read winding 13 has a current pulse applied therethrough by driver 16 having a magnitude and polarity shown by current pulse (1), a counter-clockwise flux is generated around read aperture 11 with a remanent condition illustrated by a flux pattern 2(*b*). Because the flux has been reversed, a voltage pulse (1') is induced within sense winding 14 having a polarity which is defined and shown as negative. Similarly, when a negative current pulse (2) is applied to winding 13 by source 16, the flux around read aperture 11 is reversed with a remanent flux condition shown in flux pattern 2(*c*). As a result of this reversal of flux, sense winding 14 has a voltage pulse (2') induced therein having a polarity which is defined and shown as positive.

Similarly, on continuance of the unblocked condition for the memory element of FIG. 1 as shown by flux pattern 2(*c*), 2(*d*) and 2(*e*), a positive current pulse (3) and a negative current pulse (4) will induce negative voltage pulses in sense winding 14 commensurate with the pulses (3') and (4'), respectively.

Accordingly, a transformer action exists between read winding 13 and sense winding 14 representing a stable low reluctance (coercive) condition around read aperture 11. (See the solid line of FIG. 3.) The magnetic flux condition around control aperture 12 plays no part in determining the voltage induced in sense winding 14 because it forms a kidney pattern around the control aperture as shown in flux pattern 2(*a*)–2(*e*). By definition, the existence of this stable unblocked (low reluctance) condition between the read winding 13 and the sense winding 14 passing through read aperture 11 may be considered as representative of a first binary digital state.

In order that the magnetic device of FIG. 1 be switched to its other high reluctance (blocked) conidtion, a negative current pulse (5) is applied to control winding 15 so as to generate a clockwise flux around control aperture 12, as shown in flux pattern 2(*f*). As a result of the application of the control magnetomotive force F, the flux within the inner leg (magnetic material between the two apertures) is reversed in direction and the flux which previously encircled read aperture 11, only, now encircles both read aperture 11 and control aperture 12.

It should be noted that the amplitude of the current pulse applied to control winding 15 need only be sufficient to derive a saturation flux, which will extend through the area between the apertures (inner leg) because care was taken to select the polarity of the control current pulse to derive flux having the same direction as the flux in the outer leg around read aperture 11. Since the amplitude of the current pulse applied to the control winding is small, the remanent flux pattern around control aperture 12 in combination with the modified flux pattern around aperture 11 appear like a pulley. By reason of the fact that each leg adjacent read aperture 11 is saturated in the same direction and the fact that the reluctance of the flux path, which now extend around the "pulley pattern," is higher, a current pulse applied to read winding 13, which was previously adequate, will no longer be adequate to reverse the flux around aperture 11, so as to induce a voltage in sense winding 14.

For example, again referring to FIG. 2, if a positive current pulse (6) is applied to read winding 13 when the flux pattern 2(*f*) is present in the magnetic material around apertures 11 and 12, a very small or zero voltage (6′) is induced in read winding 14 as shown because of the aforementioned blocking action. As noted in FIG. 2, the flux pattern 2(*g*) remains the same as flux pattern 2(*f*). Similarly, if a negative current pulse (7) is applied to read winding 13, a very small voltage (7′) or zero voltage is induced in sense winding 14 and the flux pattern 2(*h*) remains substantially the same as flux patterns 2(*f*) and 2(*g*).

It will be noted that in the operation of the memory element 10, as described, it was important that the current pulses applied to read winding 13 were alternately of a positive and negative polarity. This importance is based upon the fact that prior to the writing or control operation resulting from current pulses (5), the reference flux in the leg of the material most remote from the control aperture must be in the same direction as that shown for the magnetic material between the two apertures during the blocked condition. This limits the current amplitude required for control current pulse (5) and at the same time provides a desirable reference condition when the memory elements are arranged and operating in a large magnetic memory array. As a result, for every read operation both positive and negative pulses are applied to the read winding 13 and an output signal is available in the sensing winding 14 twice during the read operation when the magnetic material is in its unblocked condition. This availability of an output signal, twice in the reading operation, is the feature which is utilized to practice the teachings of the present invention.

It should be noted that the controlling operation may also be accomplished by the use of two current pulses of alternate polarity. The first current pulse may be utilized effectively to clear the memory element 10 to a reference condition exemplified by the blocked condition followed by an unblocking operation if the binary information to be written in the memory element corresponds to the unblocked state. This referencing step is desirable only when plural elements 10 are being utilized in a memory array and more than one memory element is simultaneously addressed.

Referring now to FIG. 4, there is shown the memory elements 10 arranged in a rectangular memory array 20. In the <u>FRONT VIEW</u>, the elements 10 are arranged in rows and columns in accordance with the rectangular coordinates forming a plane. In the <u>TOP VIEW</u>, plural planes are shown divided up into two sectors, A and B. Considering each coordinate location in the <u>FRONT VIEW</u> as representing a memory location, the corresponding memory element in each of the planes shown in the <u>TOP VIEW</u> may be utilized to store a bit of a word (or unit) of digital information. Since the planes are divided into two sectors, A and B, the bits in the plural planes in sector A at a particular coordinate location may represent a first word or unit of digital information and the bits in the plural planes in sector B may represent a second word or unit of digital information.

In block 21, a conventional current address instrumentation is shown for selectively addressing all the memory elements in the plural planes in the two sectors A and B located at a particular coordinate location in the <u>FRONT VIEW</u>. The arrangement of the address conductors and their operation with the conventional current address instrumentation 21 may be either of the conventional coincident current or word organized type. Whichever is being used, FIG. 4 contemplates that at all the bits in the plural planes (sectors A and B) at a given coordinate (address location) will be fully addressed for either a read or writing operation.

The memory elements 10 in each of the planes 22 have a separate inhibit winding 22 and a separate sense winding 23 associated therewith. FIG. 5 described hereinbelow is illustrative of an arrangement of memory elements, address conductors and inhibit and sense windings which may be associated with each plane utilizing the coincident current type addressing technique. Referring to FIG. 4, a sampler gate 24 is connected to each sense winding 23 associated with each plane of sector A. These sampler gates may be of conventional construction. Connected to each sense winding 23 associated with the planes of sector B are plural sampler gates 25. Associated with the plural sampler gates 24 is a common terminal 26 for gating their output to plural strobe type sense amplifiers 27. Similarly, a common terminal 28 is associated with the plural sampler gates 25, for gating their outputs to plural strobe type sense amplifier 27. Terminal 29 is commoned to all of the plural sense amplifiers 27 to provide a conventional strobe gate input.

As a result of this arrangement of plural strobe sensing amplifiers, the appropriate energization of gating terminal 26 while not energizing gating terminal 28 during a reading operation will cause a unit of digital information to be read from a fully addressed location in sector A to the input of the N strobe sense amplifiers 27. Similarly, when sector B gating terminal 28 is energized, a unit of digital information is read from the read addressed location in sector B to N sense amplifiers 27 from N sampler gates 25.

As set forth hereinabove, it is highly desirable that memory array 20 utilize both halves of the bipolar addressing current pulse applied to all of the memory elements in sectors A and B in a selected memory location represented in the <u>FRONT VIEW</u> of FIG. 4. Therefore, under the teachings of the present invention, the memory elements 10 in sector A at a selected memory location may be read via sampling gates 24 during the time that address instrumentation 21 is providing a positive polarity current pulse to the selected location and the memory elements at the same location in sector B may be read via sampler gates 25 during the time that the address instrumentation 21 is providing a negative polarity current pulse.

By using the arrangement thus described in FIG. 4, the memory elements 10 at a selected location in sector A may be energized with a current of one polarity for a half cycle and read via gates 24 while the memory elements 10 at the same location in sector B, which are not being sensed for reading, are being subjected to the same current pulse as the elements 10 in sector A. Thereafter, on the next half cycle of the address current applied to the memory elements 10 at the same location, those memory elements in sector B may be sensed via gates 25 and those in sector A are not sensed though subject to the same address current energization. Whether the elements 10 at a particular location in sector A or sector B is being read out entirely depends upon the condition of plural gates 24 or plural gates 25 in response to their gating input terminals 26 and 28, respectively.

This type of operation is only available because the memory elements 10 are of the nondestructive read out type and the memory elements 10 in sector A and the memory elements 10 in sector B are being simultaneously energized.

It is a requirement of the teachings of the present invention that each of the memory elements representing a unit of digital information in each of sectors A and B be of the nondestructive read out type and that the memory elements in both sectors be simultaneously energized during a read operation. Under these conditions, by utilizing the plural sampler gates 24 and 25 with sectors A and B, respectively, a unit of digital information can be read from memory elements in sector A or B while at the same time providing the necessary address energization to memory elements in the other sector to assure that all the memory elements being addressed are energized through a complete plus and minus polarity magnetomotive force reading cycle (as described in FIGURE 2 above).

It should be noted that memory array 20 as described in FIGURE 4, is really functioning as two separate memories capable of reading out information on each plus and each minus polarity current address for a given location. Heretofore, parallel operation of memory units represented by sector A and sector B has been known. However, it was never understood how addressing instrumentation 21 and inhibit and sensing instrumentation could be shared by utilizing the availability of sensible information during both positive and negative portions of the address cycle.

Recalling the problem described hereinabove concerning the requirement of having information read from storage at a high enough rate sufficient to provide adequate input information to other portions of the computer system such as the arithmetic and instruction register, the technique shown in FIGURE 4 may be used to provide an over-all increase of the operation rate of the computer system.

To illustrate how FIGURE 4 could be utilized in a computer system, consider that at a prior time an instruction word was decoded to provide operation information in the form of an operation code and at the same time to provide a data address for the data word on which the operation is to be performed. Thereafter, on the first half cycle of the address current provided by address instrumentation 21 to a selected memory location, the proper data word is read from sector A of FIGURE 4 via sampler gate 24 through sense amplifier 27 to the arithmetic unit for the operation described by the operation code identified in the last instruction word. Similarly, on the next half cycle of the address current applied to the memory location by address instrumentation 21, a new instruction word can be read from sector B. Thus, for one full cycle of the address instrumentation 21, two words are read from memory thereby increasing the computer operation speed by a factor of approximately two. While in the example, sector A was sampled for reading during the first half address current cycle and sector B was read during the second half of the address current cycle, it should be clear that sector B could well have been read during the first half address cycle and sector A read during the second half address cycle. This may be done by reversing the order of voltage gate pulses applied to terminals 26 and 28 of sector sampler gates 24 and 25, respectively.

The advantages for the improved memory reading operation described hereinabove are substantial. However, with respect to technique described with respect to FIGURE 4, there is a requirement that the unit of digital information read from one sector during the first half cycle must have the same memory location (address conductorwise) as the unit of digital information read from the other sector during the second half cycle. It is a very serious limitation to the programming of a computer embodying such a technique. Means for overcoming this limitation will be described hereinafter.

When memory elements 10, such as that shown in FIGURE 1 are utilized in a rectangular memory array such as shown in FIGURE 4, it is an important memory system operational feature that the control or writing operation for each memory element constitute a full cycle operation (comprising a half cycle address current of one polarity followed by a half cycle address current pulse of the opposite polarity). All of the memory elements at a given coordinate location may be put in a reference condition on the first half cycle prior to a selective control operation (plane by plane) during the second half cycle as determined by the proper energization of inhibit windings 22. Because of this requirement for referencing each memory element 10 prior to storing or writing a digital condition therein, a full cycle of the address current output of address instrumentation 21 is required for all the memory elements 10 which are being fully addressed. Moreover, since FIGURE 4 has identical address instrumentation for a given memory location in both sectors, a word or unit of digital information may be stored in sector A and in section B at the same location providing there is an inhibit driver and a separate bit of information associated with each inhibit winding 22. As shown in FIGURE 4 the inhibit drivers of the plural planes of sector A and sector B are connected with the same information source in contemplation of storing information at a selected location in either sector A or sector B during a full address cycle. Inhibit driver 31 under the control of inhibit gate terminal 33 functions to connect the source of information to be stored to sector A. Inhibit drivers 32 under the control of inhibit gating terminal 34 connect the same source of information to be stored to sector B.

With respect to the address instrumentation embodiment shown in FIGURE 4, a word may not be stored in a given location in sector A while another word is being read from sector B at the same location during the same address current cycle time because of the common addressing instrumentation shared by the two sectors. As a practical matter, considering the few write operations in a typical computer operation compared with a larger number of read operations, it may often be acceptable to utilize a full address cycle time to write a single unit of digital information in either sector A or sector B.

In summary, during both a read and a control (store or write) operation, the memory system as described in FIGURE 4, utilizes a full addressing current cycle including both a positive and a negative current half cycle. Moreover, since there are plural sectors responsive to the same addressing instrumentation two read operations may be successively performed during a full cycle of the addressing current. For example, during a period when the addressing instrumentation 21 of FIGURE 4 is selected for applying a full cycle of read addressing current to a memory location, that portion of the memory location in sector A may be read out in the first half cycle and that portion of the memory location in sector B may be read out during the second half cycle by proper energization of sector gating terminals 26 and 28. Similarly, during a full addressing current cycle, a memory location in each of sector A and sector B having identical addressing instrumentation may be subjected to a storing operation. With one source of information to be stored in a memory system as shown in FIGURE 4, a location in only one of the two sectors would be subjected to the storing operation. Had there been a source of information for both sets of inhibit drivers 31 and 32, information could have been stored in identical memory locations in both sectors. It will be recalled that the first half cycle of the storing addressing current is utilized to reference the memory elements at the selected locations while the second half addressing cycle is utilized to switch the memory elements to the final stored condition represented by the information to be written.

The following Table I is utilized as an adjunct to a simplified description of the operation of FIGURE 4.

instruction register 36. Assuming that instruction word No. 3 indicates that the contents of the accumulator of arithmetic unit 35 was to be stored in memory location 3, sector A, instruction register 36 causes address instrumen-

TABLE I (FIGURE 4)

| | First Half Cycle | Second Half Cycle |
|---|---|---|
| First Address Current Cycle | ---------- | Read Instruction Word No. 1 from location 0 (sector A or B) of memory into Instruction Register 36. [The instruction is to clear accumulator and add the contents of location 1, sector A thereto.] |
| Second Address Current Cycle | Read Contents of location 1 sector A of memory and store in accumulator of arithmetic unit 35. | Read Instruction word No. 2 from location 1 sector B of memory into Instruction Register 36. [The instruction is to add contents of location 2 sector A (or sector B) to contents of the accumulator.] |
| Third Address Current Cycle | Read Content of location 2, sector A (or sector B) and add to contents of the accumulator of arithmetic unit 35. | Read Content of location 2 sector B (or sector A) of memory into Instruction Register 36. [The Instruction is to store contents of accumulator into location 3, sector A (or sector B).] |
| Fourth Address Current Cycle | Reference Content of location 3, sector A and sector B by switching all memory elements at location 3 to a reference magnetic condition. | Store Contents of accumulator of arithmetic unit 35 in location 3, sector A (or sector B). |

Assuming that during the said second half cycle of a first address current cycle an instruction word No. 1 is read from a memory location 0 in sector A or B. Further, assuming that the instruction word No. 1 as processed through the instruction register 36 indicated that the contents of location 1 of sector A was to be read and added to the accumulator of the arithmetic unit 35 of FIGURE 4, then the first half cycle of the second address cycle would consist of the reading of the data word contents of location 1 sector A of memory and adding that data word to the arithmetic unit 35. Specifically, the instruction word No. 1 would operate on address instrumentation 21, via instruction register 36, to energize memory location 1 of both sectors A and B for a full cycle reading operation. During the first half cycle of the second address cycle the contents of the memory elements of location 1 in sector A are sampled via sampler gates 24 on proper energization of terminal 26, amplified by strobe sense amplifier 27 and passed to arithmetic unit 35.

Moreover, during the second half cycle of this reading operation on location 1, a new instruction word No. 2 is read from memory location 1 of sector B via sampler gates 25 through strobe amplifier 37 into the instruction register 36. Assuming that instruction word No. 2 indicated that the contents of memory location No. 2, sector A, was to be added to the contents of the accumulator of arithmetic unit 35, the instruction register 36 would accordingly control the energizing of address instrumentation 21 for a third address cycle. (It should be understood that instruction word No. 2 could just as well as identified the next data word as being the contents of memory location No. 2, sector B. This alternative would merely have required the proper energization of gating terminal 28 rather than gating terminal 26 during the first half of the third address cycle.) During this first half of the third address cycle, address instrumentation 21 acts to energize the memory elements of memory location 2 of both sectors A and B for a reading operation. The contents of memory location 2 of sector A are read out via sampler gates 24 via sense amplifier 27 to the arithmetic unit 35. In addition to identifying the data word, instruction word No. 2 in register 36 would have set up arithmetic unit for this operation via a program control unit (not shown).

Meanwhile, the contents of memory location No. 2 of sector B is merely being energized through the first half cycle of its reading operation without being destroyed even though no attempt is made to sample its contents until the second half cycle wherein instruction word No. 3 is read therefrom. At that time, instruction word No. 3 is read via sampler gates 25, strobing amplifiers 27, to tation 21 to energize memory location 3 in both sectors A and B for a control operation. Instruction register 36 also causes the information stored in the accumulator to be made available to bit lines 35, via circuitry not shown. As described hereinabove, during the first half cycle of the fourth addressing cycle the memory elements at location 3 of both sectors A and B are referenced to a known stored condition. Then, on the second half cycle of the fourth addressing cycle, inhibit drivers 31 which are gated via terminal 33 function to inhibit the memory elements at location 3 in accordance with the information being written from the accumulator into location 3 of sector A.

In summary, the system of FIGURE 4 may be utilized to accomplish the fundamental operations of a computer as exemplified by Table I. Moreover, these operations are performed in a manner which is improved in that during a reading cycle two separate units of digital information may be read from the two sectors of the memory. Moreover, both sectors of the memory 20 are able to share the common address instrumentation 21. As indicated hereinabove, the memory elements 10 must be of the nondestructive transfluxor type exemplified by the device of FIGURE 1. The selection of the address current instrumentation 21 may be varied. For example, either a word organized or a coincident current selection technique might be used. However, inasmuch as the magnetic device of FIGURE 1 has both a read and a control aperture, the address instrumentation 21 must take this into account. Since two units of digital information may be read during a complete reading cycle, the computer system has relative high speed capabilities. Since the address instrumentation 21 is shared for both sectors, the technique of FIGURE 4 is distinguished from the prior art technique of using two complete parallel systems.

Notwithstanding the advantages just described, the system of FIGURE 4 has some significant shortcomings. One of these shortcomings is that the location of the data and instruction words in the memory sectors is critical. For example, during the reading operation, the next instruction word must be in the same memory location in the other sector as the data word selected by the previous instruction word. This association of data words and instruction words would be relatively impractical for a computer system designed for a wide system versatility. Another shortcoming of the system of FIGURE 4 is that when a memory location of one sector of the memory is undergoing a control operation, the same memory location in the other sector is going through the same control operation as determined by the addressing current provided by address instrumentation 21. Accordingly, a complete address cycle must be utilized to write or store in a memory location of one sector. The inhibit drivers of the other sector may be utilized to overcome the affects of the store addressing cycle in that sector. However, such a requirement is impractical. To be optimum, it would be desirable for a memory location in one sector to be capable of being subjected to a control or writing operation while that same memory location in the other sector was being subjected to a reading operation. Still another shortcoming of the computer system as shown in FIGURE 4 is that the address instrumentation 21, though conventional, would be required to be substantial in terms of components and power consumption.

Accordingly, it would be highly desirable to utilize the technique of FIGURE 4 in speeding up computer system operation while at the same time modify that system so as to mitigate or eliminate the shortcomings also described. According to the teachings of the present invention this may be accomplished by retaining the features shown in FIGURE 4 except for the address instrumentation 21. Specifically, the address instrumentation 21 might be modified in accordance with address instrumentation shown in FIGURE 7. FIGURE 7 shows the same memory 20, the same inhibit circuitry and the same sensing circuitry as described in FIGURE 4 modified with respect to addressing instrumentation. For purposes of simplifying FIGURE 7, the inhibit and sampling circuitry of FIGURE 4 have not been included in FIGURE 7.

FIGURE 7 utilizes the teachings of two copending applications of one of the present inventors. Specifically, the memory address drivers and address conductors for each coordinate X and Y are arranged in a matrix in accordance with the teachings of copending patent application, Serial No. 99,845, entitled "Energizing System," filed March 31, 1961, and assigned to the same assignee as the present application. Furthermore, in order that common addressing instrumentation may be utilized for both sectors A and B of memory 20 along one coordinate, the teachings of copending application, Serial No. 91,961, entitled "Magnetic Memory Instrumentation," filed February 27, 1961, and assigned to the same assignee as the present applications are utilized. FIGURE 5A is illustrative of the address conductor technique of this latter identified application.

Specifically, referring to FIGURE 5A, an X and Y address conductor, inhibit winding and scene winding arrangement is shown which is suitable for the memory elements 10 of each of the core planes of FIGURE 7. Although FIGURE 7 shows addressing instrumentation for core planes of 64 x 64, FIGURE 5A is limited to a core plane of 4 x 4 for the purpose of simplicity. Cores 105–120 are arranged in rows (X) and columns (Y). Each of the rows is identified by the abscissa X1, X2, X3, and X4. The columns are identified by the coordinates Y1, Y2, Y3 and Y4. Each of the memory elements may be constructed as shown in FIGURE 1. Furthermore, each of the memory elements is intended to operate in the manner described in connection with FIGURE 2. As set forth hereinabove, each read operation will comprise two alternate polarity current pulses. FIGURE 5B illustrates these alternate polarity pulses and identifies them as R+ and R−. Similarly, the alternate write current pulses are illustrated as W0 and W1. It should be understood that in the matrix of FIGURE 5A, each of these current pulses will be made up of an X and Y coordinate component. The labeling of each of the address conductors according to each of the alternate polarity reading or writing pulses as shown in FIGURE 5B represents a convenient way to illustrate the advantages of the arrangement of that figure.

As shown, the memory elements in each of the rows X1, X2, X3 and X4 has a conductor passing through all of the read apertures in that row and folded back through all of the control apertures in that same row. The terminal of the conductor adjacent the control apertures is, for example, a low order X address terminal while the terminal of the conductor adjacent the read apertures is a high order X address terminal. Similarly, in the row X2 the two terminals of the conductor passing through the read and control apertures of that row are connected to high and low order address terminals, respectively. Likewise, in row X3 the address conductor passing through the plural read apertures also passes through the plural control apertures. The terminals of the address conductor are connected to low and high order address conductor terminals. Similarly, a single X address conductor passes through all the read apertures of row X4 and then through all the control apertures of the same row. The terminals of this conductor are also connected to a low order address terminal and a high order address terminal as shown. When plural planes are utilized as shown in FIGURE 7, each core plane may be constructed as that shown in FIGURE 5A and the X address conductors of each plane are connected in series. Accordingly, for each row, coordinate X1–X4, there is a high order X address terminal and a low order X address terminal.

By way of difference from the X address conductors, the Y address conductors pass through the memory elements of adjacent Y columns. Specifically, a Y address conductor is shown passing through all of the read apertures of the memory elements in column Y1 and then back through all of the control apertures of the elements in column Y2. The terminal adjacent the control apertures of column Y2 is designated the low order Y1 address terminal. The terminal adjacent the read apertures of column Y1 is designated the high order Y1 address terminal. Similarly, a Y2 addressing conductor is shown passing through all of the read apertures in column Y2 and then back through all of the control apertures of column Y1. The terminal adjacent the read apertures of column Y2 is designated the high order Y1 address terminal, and the terminal adjacent the control apertures of column Y1 is called the low order Y2 address terminal. The Y3 address conductor passes through the read apertures of the elements in column Y3 and back through the control apertures of the memory elements in collumn Y4. The terminal of this address conductor adjacent the read apertures of column Y3 is called the high order Y3 address terminal. The terminal of that address conductor adjacent the control apertures of column Y4 is called the low order Y3 address terminal. Finally, an address conductor is passed through all the read apertures of the elements of column Y4 and then back through all of the control apertures of the elements in column Y3. The terminal adjacent the read apertures of column Y4 is the high order Y4 address terminal. The terminal adjacent the control apertures of column Y3 is called the low order Y4 address terminal. If plural memory planes are connected together as shown in FIGURE 7, corresponding Y address conductors are connected in series resulting in the same number of Y address terminals as shown in FIGURE 5A.

Each of the read apertures of the memory elements in FIGURE 5A has passing serially therethrough a sense winding. As shown, the order through which each memory element is passed is determined by the best half-select current compensation available. Such an arrangement of a sense winding is well known in the art. One terminal of the sense winding is shown grounded.

In addition to the memory elements of each plane having a sense winding passing therethrough there is also placed an inhibit winding. The arrangement of the inhibit winding is according to well established principles. One terminal thereof is grounded while the other terminal is made available for energization.

The wiring arrangement of FIGURE 5A as described hereinabove has two distinguishing characteristics. One of these characteristics is that for a given memory element a reading or writing operation is performed by the mere polarity sequence reversal of the currents caused to flow in the Y address conductor associated with that element. For example, assuming that it was first desired to read from element 105 in the upper left hand corner of FIGURE 5A, then low order Y1 address terminal would be energized for a R+ current pulse and the low order X4 address terminal would be energized with a R+ current pulse. The current passing through the read aperture of element 105 in the X and Y address conductor would then be in the same + direction. Moreover, on the following addressing half cycle, a R− current pulse would be applied to the high order Y1 address terminal and a R− current pulse would be applied to the high order X4 address terminal. Then the read aperture of element 105 would be receiving a current pulse from the two address conductors passing therethrough which is in the negative direction. Accordingly, element 105 would have been read addressed through a full read address cycle. If it is now desired to control or write into element 105, it is necessary to switch to the adjacent Y2 address terminals and pass an R− or W0 current pulse therethrough in the direction of the arrow during the first half cycle of the control operation, whereupon, during the second half cycle of the control operation the current pulse is reversed through the Y2 address terminals as R+ or W1. In summary, there were two steps require to convert a reading operation for element 105 to a control or writing operation. One, the Y address should be shifted from the Y1 addressing terminals to the Y2 addressing terminals and, two, the sequence of current pulses should be shifted to a negative pulse R− or W0 followed by R+ or W1, rather than R+ followed by R−.

By utilizing the wiring technique of FIGURE 5A in the memory planes of FIGURE 7, the addressing the technique of FIGURE 7 can be considerably more versatile than the rudimentary instrumentation of FIGURE 4. For example, all of the memory locations in sectors A and B of FIGURE 7 can be addressed by using the same addressing for both reading and writing. Accordingly, while a particular location in memory 20 is being addressed with respect to its X coordinate, the unit of information in sector A of the memory may be going through a store operation while the memory elements at the same or related location in sector B may be going through a read operation. No sequencing of current polarity is required for the X address locations for either read or write operations, nor is it required to modify the X address information.

While FIGURE 7 uses the same X address information for addressing both sectors A and B, FIGURE 7 shows sectors A and B of memory 20 having separate Y address instrumentation. Stated another way, sectors A and B of memory 20 function as separate memories with respect to the Y coordinate address instrumentation.

FIGURE 6 shows a format of an instruction word and a data word which is usable to understand the operation of FIGURE 7. It assumes that each of the sectors A and B of memory 20 contains 25 memory planes. Therefore, the data word can be up to 25 bits long including polarity and parity information. Similarly, the instruction word can be up to 25 bits in length. Because the memory plane selected for this example is 64 x 64 elements, three low order bits and three high order bits are required to define an address along each coordinate.

Specifically, it is noted that the low order X address bits B1, B2 and B3 set up a three stage memory address register (MAR) 201. Similarly, high order X address bits B4, B5 and B6 set up the conventional three stage memory address register 202. As those skilled in the art know, the output of each of these address registers 201 and 202 may be passed through conventional address decoders 204 and 205, respectively, to generate a 1 of 8 selection in both the low order and high order address driver matrices 206 and 207. Since the conductor arrangement of FIGURE 5A is identified on the basis of the read apertures and the aforementioned relationship of the Y address conductors with respect to control and read apertures is present, it is necessary in selecting a column of elements for a control operation to address the next adjacent column based on the read aperture designation. The complement command provided to registers 210 and 211 for sectors A and B, respectively, provides this necessary modification of the memory address when a control operation is taking place in either sector A or B. For a given memory location in sector A and B no address modification is required in the X coordinate to switch a reading addressing operation to a control or writing operation when using an address conductor arrangement as shown in FIGURE 5A. Each instruction word need only have six bits of information to designate the full high and low order X address. As shown in FIGURE 6, this is not true with respect to the number of bits in the instruction word which are required to identify the Y coordinates of either the next data word or the next instruction word. In FIGURE 7, each sector of memory 20 contains a completely separate Y address instrumentation. In the present example, six bits of the instruction word of FIGURE 6 are used to identify the low and high order Y address information for sector A. Similarly, six additional bits of the instruction words are required to identify the high and low order Y address information for sector B.

Low order Y address bits B7, B8 and B9 set up a three stage memory address register 210. Similarly, high order Y address bits B10, B11 and B12 set up the conventional three stage memory address register 211. As those skilled in the art know, the output of each of these address registers 201 and 202 may be passed through conventional address decoders 212 and 214, respectively, to make a selection in both the low order and high order address driver matrices 213 and 215 to provide address current pulses in a selected Y address conductor within sector A of memory 20. Similarly, the low order Y address bits B13, B14 and B15 set up a three stage memory address register (MAR) 216. High order Y address bits B16, B17 and B18 act to set up the conventional memory address register 217. The output of each of these address registers 216 and 217 are then passed through a conventional address decoder 218 and 220, respectively, to generate a one of eight selection in both the low order and the high order of Y address drive matrices 219 and 221, respectively, to provide address current pulses in a selected Y address conductor within sector B of memory 20.

Copending patent application, Serial No. 99,845, entitled "Energizing System," filed March 31, 1961, by A. W. Vinal, and assigned to the same assignee as the present application, may be referred to for the detail of the bidirectional current driver matrix operation associated with drivers 206 and 207 operating on the address conductors in the X coordinate of both sectors A and B, current drivers 213 and 215 operating on the address conductors along the Y coordinate in sector A and current drivers 219 and 221 operating on the address conductors in the Y coordinate associated with sector B.

It will be understood from the above description of FIGURE 5A that the current pulses applied to selected X address conductor are the same whether a memory location in sector A or sector B was being subjected to a read or control (writing) operation. Furthermore, during a reading operation, the address driver and selection instrumentation for that sector operates in the same manner for the selected Y address conductor as in the selected X address conductor.

On the other hand, when a memory location in either sector was to be subjected to a storing (writing) operation, FIGURE 5A illustrates that two special requirements are present. First, the contents of the lowest order bit of the low order Y memory address register 216 must be complemented, and, second, the polarity sequence of the addressing current must be changed from a plus pulse followed by a minus pulse to a minus pulse followed by a plus pulse. The basis for the low order address bit being complemented is found in the fact that control apertures of one column had a Y address conductor passing through the read aperture of the next higher or lower numbered column corresponding to whether the column number is odd or even.

Since, as indicated hereinabove, the storing operation consists of first referencing the memory elements in the selected memory location the storing operation always takes place in the second sector of the sequence. For example, if sector B will be the location of the unit of digital information to be stored, then the sequence register 228 is set to sequence A–B. AND circuit 225 provides the complement command signal for the low order stage of address register 216 of sector B when a decision to initiate a store operation causes the store gate to provide an input in the presence of a sequence signal of A–B. On the other hand, if the storing operation is to take place in sector A, the sequence register 228 indicates sequence B–A. Accordingly, AND circuit 226 provides a bit input to the low order stage of register 210 on the occurrence of a store gate in the presence of a sequence indication of B–A.

Also shown in FIGURE 7 is a timing and control generator to provide some of the essential timing signals necessary for the system of FIGURE 7 to operate. This timing and control generator is shown as a block 227 and its circuit details are conventional. As shown, timing and control generator 227 receives at least five inputs. One is a memory cycle gate indicating the initiation and duration of a memory operation cycle which may be either synchronous or asynchronous as required; two other inputs may be read and/or store command gates as determined by the operational code content of the instruction word controlling the memory operating cycle; two other inputs are the alternate outputs of the sequence register 228 storing a binary condition as determined by the sequence bit 19 of the instruction word.

Conventional timing and control generator 227 may include the following outputs to assure the proper operation of the system of FIGURE 7 as it modifies FIGURE 4:

Read Gate A
Read Gate B
Inhibit Gate A
Inhibit Gate B
Sense Strobe Gate
X Coordinate Current Gate
Y Coordinate Current Gate
High Order X Polarity Gate
Low Order X Polarity Gate
High Order Y Polarity Gate Sector A
Low Order Y Polarity Gate Sector A
High Order Y Polarity Gate Sector B
Low Order Y Polarity Gate Sector B FIGURE 8 has electrical waveforms showing the nature of the output by timing and control generator 227 which will be useful in understanding the operation of FIGURE 7 as it modifies the system of FIGURE 4. FIGURE 8 has waveforms which may be categorized as relating to (1) the sensing of information in either sector A or B during either sequence A–B or B–A; (2) the current addressing of a particular memory location in either sector A or B during both read and write operations; and (3) the inhibit operation during either sequence A–B or sequence B–A in sector A or B.

More specifically, FIGURE 8, at the top of the graph, contains two waveforms, one labeled set MAR and the other labeled reset MAR. On the occurrence of the set MAR pulse shown, the contents of the last instruction word which is present in instruction register 36 of FIGURE 4 is loaded into the memory address registers 201,

202, 210, 211, 216 and 217, thereby fully identifying in a particular location in sector A and another particular location in sector B. Since the X coordinate information of memory address registers 201 and 202 is common to both sectors A and B, the location selected in each of sectors A and B has to be in the same row (X). During the duration of the memory operation a memory cycle gate will be present at the input of timing and control generator 227. At the end of the memory operation or cycle, each of the above-identified memory address registers are reset as shown in the timing diagram.

As set forth hereinabove, the address driver matrix arrangement utilized in FIGURE 7 is that described in detail in copending application, Serial No. 99,845. Briefly, the current address driver arrangement requires the selection of a voltage source and a current sink for each polarity of the current being applied to a particular address conductor. During one polarity of a current pulse a voltage source identified with a high order address and a current sink is identified by a low order address. During the other polarity of the current pulse, the low order address will identify the voltage source and the high order address will identify the current sink.

In order for such an operation to take place, high and low order polarity gates are generated for both the X and Y coordinates. Moreover, these gates in combination with X and Y current gates are utilized within the aforementioned address driver matrices to generate address current pulses, as shown in FIGURE 8, by the X address current pulse waveform for both sectors A and B, the Y address current pulse waveform for sectors A and Y address current pulse waveform for sector B. It will be recalled that the X address current pulses, as shown, are applied to the address conductor at the selected location in both sectors A and B during the first half and the second half cycles of the addressing cycle regardless of whether the operation is one of reading or controlling (writing). However, because the addressing system of FIGURE 7 utilizes separate Y address instrumentation for the different sectors, different Y address current pulses are applied to the conductor at the selected location in sector A than to the conductor at the selected location in sector B. Moreover, the polarity sequence of the current pulses applied to the selected Y address conductor in either of the sectors is different during the store operation than in the read operation. This polarity sequence difference is not present with respect to the X coordinate current pulses which pass through both sectors. To provide for this type of operation, the X polarity gates XH and XL having waveforms, as shown, are generated in the output of timing and control generator 227 and applied to the terminals so labeled for application to the address drivers 207 and 206 directly and indirectly. Also, timing control generator 227 functions to generate an X current gate with the waveform shown for the first and second half cycle of the addressing operation. To generate the X address current pulse shown in the address conductor of the selected location of both sectors during the first half addressing cycle, the up level of X polarity gate signal XH energizes the voltage source of the selected X address conductor via driver matrix 207, while the X current gate acts to turn on a selected current sink in the driver matrix 206. The X current gate is effective in driver matrix 206 only when polarity gate XH is at an up level so as to open sink gate 230.

On the other hand, during the second half addressing cycle X polarity gate XH is at a down level and the high order voltage source within address driver matrix 207 is not energized and sink gate 230 is not open. However, X polarity gate XL is at an up level thereby providing a voltage source to the selected conductor via address driver matrix 206. Also, X polarity gate XL opens sink gate 231 so that the X current gate which is also at an up level can energize a selected current sink connected to the selected X address conductor. As a result of connecting a voltage source and current sink at opposing extremities of the selected X address conductor, the X address current waveform is reversed, as shown in FIGURE 8.

With respect to the Y coordinate, sector A, Y polarity gate YHA selects a voltage source in address driver matrix 215 and opens sink gate 232 so that the Y current gate will energize a selected current sink connected to the selected Y address conductor in sector A. Similarly, Y polarity gate YLA, during the second half cycle, functions to select a voltage source in address driver matrix 213 and open sink gate 233 to the Y current gate which in turn energizes a current sink associated with the same selected Y address conductor. As a result, the current passing through the selected conductor is reversed for the second half addressing cycle. It is important to note that the polarity of the Y polarity gate generator reverses during the store operation. Therefore, the current passing through the selected Y address conductor is reversed in polarity sequence. Y polarity gates YHB and YLB associated with sector B cooperate with address driver matrices 219 and 221, the Y current gate and sink gates 234 and 235 to generate the Y current pulses during the first and second half cycle address operation having the waveforms shown in FIGURE 8 in the same manner as did the Y polarity gates with respect to sector A.

Also shown in FIGURE 8, are read gate waveforms to be applied to terminals 26 and 28 of sectors A and B, respectively, in FIGURE 4. As shown, the read gates have to correspond to the sequence A–B or B–A as determined by bit 19 (sequence bit) of the instruction word. Also shown, the waveform of FIGURE 8 is the strobe gate 29 located within the timing period associated with the aforementioned sector gates. Also shown in FIGURE 8, is an inhibit gate waveform to be applied to terminals 33 and 34 of FIGURE 4 as determined by the selected sequence A–B or B–A.

The system of FIGURE 7, as it modifies FIGURE 4, is much more flexible than the system of FIGURE 4 without this modification. Whereas the system of FIGURE 4 utilized a minimum of addressing instrumentation, the system of FIGURE 7 (as it modifies the system of FIGURE 4) utilizes separate Y addressing instrumentation for each sector. This separate Y address instrumentation reflects itself into the bit length requirement of the instruction word shown in FIGURE 6. To illustrate the flexibility of the system of FIGURE 7 as it modifies the system of FIGURE 4, an exemplary computer operation cycle will be described. Table II illustrates this computer operation cycle.

Referring to Table II (FIGURE 7), and assume that during the second half cycle of a first address current cycle, an instruction word No. 1 is read from a memory location 0 in sector A or B. Further assume that the instruction word No. 1 as processed through the instruction register 36 indicates that the contents of location 1 of sector A was to be read and added to the accumulator of the arithmetic unit 35 of FIGURE 4. In addition to the identification of location 1 of sector A as containing the data word instruction word No. 1 would also contain an address for the next instruction word to be read on the second half cycle. In the addressing embodiment of FIGURE 4, this second address requirement is not present because a given location in sectors A and B have the identical instrumentation. Referring to FIGURE 7 and the instruction word of FIGURE 6, it should be noted that the X address instrumentation and the X address bits of the instruction word are identical for both sectors A and B. On the other hand, sectors A and B of memory 20 have different Y address instrumentation and different address bits in the instruction word. This latter factor gives the computer program considerable more flexibility in that the location of the word read during the first half cycle need not be related to the location of the word read during the second half cycle except by having an identical X (row) coordinate. By and large, during a full address current cycle in which a read operation takes place during the first half cycle and a reading operation takes place during tht second half cycle, the second half cycle may be devoted to reading an instruction word. The number of instruction words and data words that are allotted to a given memory operating with the address embodiment of FIGURE 7 may be subject to certain restrictions based upon the common X address coordinate during both half cycles of a full addressing current cycle.

As a result of the content of the instruction word No. 1, as indicated in Table II, the first half cycle of the second address current cycle will consist of reading the data word contents of location 1, sector A, of the memory. Sector Gate A, as shown in the waveform of FIGURE 8, is timed to pass the information to the arithmetic unit 35 via the strobed sense amplifier. Note the strobe pulse waveform also shown in FIGURE 8, during the first half cycle.

During the second half cycle of the second address current cycle, a second reading operation takes place in location 2 of sector B of memory into instruction register 36. The instruction is to add the contents of location 3, sector A (or the contents of location 4, sector B), to the contents of the accumulator. Note that the reading operation dur-

TABLE II (FIGURE 7)

| | First Half Cycle | Second Half Cycle |
|---|---|---|
| First Address Current Cycle | ---------- | Read Instruction Word No. 1 from location 0 (sector A or B) of memory into Instruction Register 36. [The instruction is to clear accumulator and add the contents of location 1 sector A thereto and also read instruction word No. 2 from location 2, sector B.] |
| Second Address Current Cycle | Read Contents of location 1, sector A of memory read and stored in accumulator of arithmetic unit 35. | Read Instruction Word No. 2 from location 2, sector B of memory into Instruction Register 36. [The instruction is to add contents of location 3, sector A (or contents of location 4, sector B) to contents of the accumulator and also read instruction word No. 3 from location 5, sector B (or location 6, sector A).] |
| Third Address Current Cycle | Read Content of location 3, sector A (or location 4, sector B) and add to contents of the accumulator of arithmetic unit 35. | Read Content of location 5, sector B (or location 6, sector A) of memory instruction word No. 3 into Instruction Register 36. [Instruction word No. 3 is to store contents of accumulator into location 7, sector A (or location 8, sector B) and also read instruction word No. 4 from location 9, sector B (or location 10, sector A).] |
| Fourth Address Current Cycle | Reference Content of location 7, sector A (or location 8, sector B) by switching all locations to reference magnetic condition. Read Instruction word No. 4 from location 9, sector B (or location 10, sector A). | Store Contents of accumulator of arithmetic unit 35 in location 7, sector A (or location 8, sector B). |

ing the second half cycle is not limited to the same location in sector B as that subjected to the reading operation in sector A during the first half cycle. This is the result of the fact that sector B has separate Y address instrumentation. Instruction word No. 2 contains X address information for both sectors and separate Y address information for both sectors identifying location 3, sector A (or location 4, sector B) as the data word to be read out during the first half cycle and location 5, sector B (or location 6, sector A) of the memory as the location of instruction word No. 3 during the second half cycle of the third address cycle. The versatile address current instrumentation of FIGURE 7, provides a substantial degree of freedom to the computer programmer in arranging the data in instruction words in the computer. Instruction word No. 3 is read into the instruction register 36 where it operates with the address instrumentation and the program control unit to set up the operation described in that instruction word.

Assuming that instruction word No. 3 is to store the contents of the accumulator into location 7 of sector A (or location 8 of sector B), it also can contain the address of a new instruction word which may be read during the fourth address current cycle while a storing operation takes place in the other sector. Reference to Table I will indicate that the reading of an instruction word from a location in one sector while writing or storing a data word in a location in the other sector was impossible with the address instrumentation embodiment of FIGURE 4. The reason for this is that the two sectors did not have separate addressing instrumentation. While the address embodiment of FIGURE 7 does not have a completely separate address instrumentation for the two sectors, for example, in the X coordinate it will be recalled that to perform a write operation in a given location in one of the sectors the current pulse polarity sequence in the Y coordinate address need only be reversed. This reversal of polarity sequence along the Y coordinate also had to be accompanied by modifying the Y low order address by one location. With respect to the description of FIGURES 5A and 5B, it will be recalled that this could be accomplished by complementing the least significant bit of the low order Y address register associated with the sector where the storing operation is to take place.

It should be especially noted that when either the address embodiment of FIGURE 4 or the address embodiment of FIGURE 7 is being utilized, the sequence with which a location in sector A or a location in sector B could be operated on was a matter of choice determined by the content of the instruction word in its sequence bit shown in FIGURE 6 as bit 19. It should be noted in this respect, however, that the storing operation involving inhibit current pulses should take place in the second half cycle of the following address current cycle in that during the first half cycle the memory location being subjected to a store operation could be referenced to a known magnetic condition represented in the present description as a binary 0 or write 0 (W0).

Referring back to the contents of instruction word No. 3 and assuming that location 7, sector A, was to be subjected to a storing operation, location 7 of sector B might be the location of the next instruction word. Then, during the first half cycle of the fourth address current cycle, the low order Y address register for sector A having been complemented in its lowest bit position would cooperate with the high order Y address instrumentation of sector A to reverse the polarity sequence of the store or write current pulse applied to the address conductor associated with location 8. The waveforms of FIGURE 8 show the nature of this polarity pulse sequence reversal. During the first half cycle of the fourth address current cycle, the memory elements of location 7 of sector A would be switched to a binary 0 or W0 position (see FIGURE 2), which represents a reference magnetic position.

Meanwhile, location 9 in sector B having the same X coordinate as location 7 of sector A is subjected to the normal reading operation by the address instrumentation associated with that sector. Instruction word No. 4 may then be read from the location 9. Alternatively, the location 9, sector B, might be read from the memory during the second half cycle of the fourth address current cycle. In any event, during the second half cycle, the memory elements of location 7 of sector A are subjected to a writing operation, which all the bit positions would be switched to a binary 1 position except for those bit planes which are subjected to an inhibit current in the inhibit winding in accordance with the data word stored in inhibit drivers 31. Had the writing operation been applied to sector B instead of sector A, inhibit drivers 32 would have contained the information to be stored. The waveforms of FIGURE 8 illustrate the relationship between the inhibit gates applied to terminal 33 or 35, as appropriate, with the address current applied by the address instrumentation. It should be noted that if there was a computer operation need for storing a memory location in each of sectors A and B simultaneously during a full address current cycle, this could be accomplished by merely modifying the Y address driver instrumentation of both sectors for a proper current pulse polarity sequence and providing a separate input source for the inhibit drivers of FIGURE 4.

In summary, the address instrumentation embodiments of FIGURE 4 and FIGURE 7 differ in two ways. One, versatility in locating data words and instruction words in the two sectors during the reading and writing operation. This limitation refers to the location of data and instructon words being operated upon during a full address current cycle. Secondly, the address embodiment of FIGURE 7 has the advantage that a reading operation can be performed in a memory location in one sector while a storing operation can be performed on a memory location in the other sector.

It should be noted that the computer system of FIGURE 4, as modified by the address instrumentation embodiment of FIGURE 7, generally allows two reading operations or two writing operations or a combination thereof, during a given full address current cycle without the requirement of resorting to two full memory instrumentations as did the prior art. This improved result was based on (1) using nondestructive memory elements and, (2) of using an address conductor wiring arrangement as shown in FIGURE 5A in the system described. It is emphasized that heretofore the reading or writing operation rate for a computer system was limited by the time period of the full address current cycle. According to the teachings of the present invention, this computer system operation rate can be increased up to a factor of two.

While the computer system described herein, in connection with FIGURES 4 and 7, shows the memory readout to be of a parallel form, it should be clear that the same technique could be utilized for a serial readout or a combination parallel-serial read out in accordance with copending application, Serial No. 79,722, entitled "Magnetic Memory System," filed December 30, 1960, and now U.S. Patent 3,231,871, by A. W. Vinal and assigned to the same assignee as the present application.

It is emphasized that even if the nondestructive memory elements were arranged in two memory sectors where each had both separate X address instrumentation and separate Y address instrumentation, the reading (sensing) and inhibiting instrumentation could be shared to great advantage so that the two memories could operate in parallel with a read operation or a write operation, or a combination thereof, being conducted in both sectors simultaneously in time phase. On the other hand, if the memory elements were of the destructive read out type, the parallel operation of the two sectors would have to be skewed (overlapped) so that read out operation in one sector was being conducted during the write or regeneration operation in the other sector. This would inevitably result in the loss of at least one half address cycle in computer operation involving branching and sub-routines.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A computer system comprising a memory including a plurality of nondestructive memory elements, said elements having the ability in response to application thereto of full reading energization of an electrical quantity having two half cycle waveforms of alternate polarities to produce output signals representative of the stored information during application of each said half cycle waveform, said memory elements being arranged in planes according to rectangular coordinates, said planes of memory elements being arranged in two sectors so that a memory element in a corresponding location in each plane of a sector may store a bit of digital information making up a unit of information in that sector, energizing means cooperating with the memory elements providing a full reading and writing energization of the elements forming a unit of information in one sector simultaneously with the energization of a unit of information in the other sector, said energization means providing an electrical quantity having a half cycle waveform of one polarity followed by a half cycle waveform of the other polarity, means for sensing outputs from the elements forming a unit of information in the first sector during the first reading half cycle of said energization means and means for sensing outputs from the elements forming a unit of information in the second sector during the second reading half cycle of said energization means.

2. A computer system comprising a memory including a plurality of nondestructive memory elements, said elements having the ability in response to application thereto of full reading energization of an electrical quantity having two half cycle waveforms of alternate polarities to produce output signals representative of the stored information during application of each said half cycle waveform, said memory elements being arranged in planes according to rectangular coordinates, said planes of memory elements being arranged in two sectors so that a memory element in a corresponding location in each plane of a sector may store a bit of digital information making up a unit of information in that sector, energizing means cooperating with the memory elements providing a full addressing energization for writing in or reading from the elements forming a unit of information in one sector simultaneously with the energization of a unit of information in the other sector, said energization means comprising an X coordinate address instrumentation which is common to corresponding memory locations in both sectors, said energizing means comprising a separate Y coordinate address instrumentation for corresponding memory locations in said first and second sectors, said X and Y coordinate address instrumentation providing simultaneously a full address energization to the memory elements in a selected memory location in each of said sectors deriving therein an electrical quantity having one polarity during a first half cycle and an electrical quantity of the other polarity during a second half cycle, means for sensing outputs from the elements forming a unit of information in the selected location in the first sector during the first reading half cycle of said energizing means and means for sensing outputs from the elements forming a unit of information in the selected location in the second sector during the second reading half cycle of said energizing means.

3. A computer system comprising a memory including a plurality of nondestructive memory elements, said elements having the ability in response to application thereto of full reading energization of an electrical quantity having two half cycle waveforms of alternate polarities to produce output signals representative of the stored information during application of each said half cycle waveform, said memory elements being arranged in planes according to rectangular coordinates, said planes of memory elements being arranged in two sectors so that a memory element in a corresponding location in each plane of a sector may store a bit of digital information making up a unit of information in that sector, energizing means cooperating with the memory elements providing a full addressing energization for writing in or reading from the elements forming a unit of information in one sector simultaneously with the energization of a unit of information in the other sector, said energization means comprising an X coordinate address instrumentation which is common to corresponding memory locations in both sectors, said energizing means comprising a separate Y coordinate address instrumentation for corresponding memory locations in said first and second sectors, said X and Y coordinate address instrumentation providing simultaneously a full address energization to the memory elements in a selected memory location in each of said sectors deriving therein an electrical quantity having one polarity during a first half cycle and an electrical quantity of the other polarity during a second half cycle, each of said two sectors having separate sensing means coupled thereto, first and second separate enabling means, the first enabling means being coupled to the sensing means of the first sector and the second enabling means being coupled to the sensing means of the second sector, the first enabling means being activated during the first reading half cycle of said energizing means, and the second enabling means being activated during the second reading half cycle of said energizing means during a reading operation in the selected memory locations of said first and second sector, each said separate Y address instrumentation for said first and second sector functioning to provide an electrical quantity having an alternate half cycle polarity sequence which is identical.

4. A computer system comprising a memory consisting of plural nondestructive memory elements, said elements having the ability in response to application thereto of full reading energization of an electrical quantity having two half cycle waveforms of alternate polarities to produce output signals representative of the stored information during application of each said half cycle waveform, said memory elements being arranged in two sectors so that the cooperating memory elements storing a unit of digital information are in one of said two sectors, energizing means cooperating with said nondestructive memory elements so that the full addressing energization for writing in or reading from the elements forming a unit of information in one sector is simultaneous with the energization of a unit of information in the other sector, said energization means at least during a reading operation providing an electrical quantity having a half cycle waveform of one polarity and a waveform of the other polarity during the following half cycle, means for sensing outputs from the elements forming a unit of information in the first sector during the first half cycle of said energization means during a reading operation and means for sensing outputs from the elements forming a unit of information in the second sector during the second half cycle of said energization means during said reading operation.

5. A computer system comprising a memory consisting of plural nondestructive memory elements, said elements having the ability in response to application thereto of full reading energization of an electrical quantity having two half cycle waveforms of alternate polarities to produce output signals representative of the stored information during application of each said half cycle waveform, said memory elements being arranged in two sectors so that the cooperating memory elements storing a unit of digital information are in one of said two sectors, energizing means cooperating with said nondestructive memory elements so that the full addressing energization for writing in or reading from the elements forming a unit of information in one sector is simultaneous with the energization of a unit of information in the other sector, said energization means at least during a reading operation providing an electrical quantity having a half cycle waveform of one polarity and a waveform of the other polarity during the following half cycle, a common output register for both said sectors, means for sensing outputs from the elements forming a unit of information in the first sector and supplying said outputs to said common output register during the first half cycle of said energization means during a reading operation and means for sensing output from the elements forming a unit of information in the second sector and supplying said outputs to said common output register during the second half cycle of said energization means during said reading operation.

6. A computer system comprising a memory consisting of plural nondestructive memory elements, said elements having the ability in response to application thereto of full reading energization of an electrical quantity having two half cycle waveforms of alternate polarities to produce output signals representative of the stored information during application of each said half cycle waveform, said memory elements being arranged in two sectors so that the cooperating memory elements storing a unit of digital information are in one of said two sectors, energizing means cooperating with said nondestructive memory elements so that the full addressing energization for writing in or reading from the elements forming a unit of information in one sector is simultaneous with the energization of a unit of information in the other sector, said energization means at least during a reading operation providing an electrical quantity having a half cycle waveform of one polarity and a waveform of the other polarity during the following half cycle, separate sense winding means coupled to the elements of each sector to carry the output signals upon readout of information from the associated sector, common amplifying and registering means for receiving information from both sectors, the corresponding sense winding means from each sector being coupled in common to said amplifying and registering means, a separate set of sampler gates for each sector coupled between the sense winding means of that sector and the common amplifying and registering means and being effective to control transmission of information from the associated sense winding means to the common amplifying and registering means, means operable during the first half cycle of a reading operation to activate the sampler gates of the first sector and means operable during the second half cycle of a reading operation to activate the sampler gates of the second sector.

References Cited by the Examiner

UNITED STATES PATENTS

| | | | |
|---|---|---|---|
| 2,911,631 | 11/1959 | Warren | 340—174 |
| 3,015,809 | 1/1962 | Myers | 340—174 |
| 3,056,117 | 9/1962 | Booth | 340—174 |
| 3,110,017 | 11/1963 | Thornton | 340—174 |
| 3,110,887 | 11/1963 | Modlinski | 340—174 |

BERNARD KONICK, *Primary Examiner.*

IRVING L. SRAGOW, *Examiner.*

M. K. KIRK, J. W. MOFFITT, *Assistant Examiners.*